United States Patent [19]

Masuda et al.

[11] Patent Number: 4,666,679
[45] Date of Patent: May 19, 1987

[54] CERAMIC OZONIZER

[75] Inventors: Senichi Masuda, Tokyo; Isamu Fukuura; Hisaharu Shiromizu, both of Aichi, all of Japan

[73] Assignee: NGK Spark Plug Co., Ltd., Aichi, Japan

[21] Appl. No.: 756,240

[22] Filed: Jul. 18, 1985

[30] Foreign Application Priority Data

Jul. 18, 1984 [JP] Japan ................. 59-150342
Aug. 10, 1984 [JP] Japan ................. 59-168427
Aug. 23, 1984 [JP] Japan ................. 59-174000

[51] Int. Cl.$^4$ ................. B01J 19/08; C01B 13/11
[52] U.S. Cl. ................. 422/186.2; 422/186.07; 422/186.14
[58] Field of Search ........... 422/186.2, 186.14, 186.07, 422/186.19, 186.11, 186.08, 186.04, 707; 204/176; 55/135, 143, 145, 155, 156, 142

[56] References Cited

U.S. PATENT DOCUMENTS

| 2,615,841 | 10/1952 | Thorp et al. | 55/145 X |
| 3,663,418 | 5/1972 | Kawahata | 422/186.11 |
| 3,973,133 | 8/1976 | Emigh et al. | 422/186.11 |
| 3,973,932 | 8/1976 | Alskog | 55/142 X |
| 3,996,122 | 12/1976 | Lowther | 204/176 |

FOREIGN PATENT DOCUMENTS

| 59-44782 | 3/1984 | Japan . | |
| 59-44797 | 3/1984 | Japan . | |
| 0068522 | 1/1987 | Japan | 422/186.07 |

Primary Examiner—John F. Terapane
Assistant Examiner—Susan Wolffe
Attorney, Agent, or Firm—Finnegan, Henderson, Farabow, Garrett and Dunner

[57] ABSTRACT

A compact, large capacity ozonizer device includes an insulated first ceramic substrate provided with an electrode on one or both sides, and a support such as a corrugated member attached to the first substrate and on which is mounted a second substrate composed of metal or insulating ceramic with an electrode mounted thereon, the first and second substrates and the first support means forming a space through which a gas is passed to be oxidized when a high voltage is applied across the two electrodes or the electrode and the metal plate. A third substrate is supported by a second support member mounted on the second substrate to form a space through which cooling fluid is passed, the cooling fluid moving in a direction different from the direction that the gas to be oxidized flows.

15 Claims, 12 Drawing Figures (h)

(g)

(f)

(e)

(d)

(c)

(b)

(a)

4,666,679

CERAMIC OZONIZER

BACKGROUND OF THE INVENTION

1. Field of the Invention

This invention relates to an ozonizer comprising layers of ceramic ozonizers and more particularly to an apparatus for the production of $O_3$, denitration and desulfurization by the oxidation of $O_2$, NOx and SOx, respectively. An ozonizer acts as a high-potency ion source when it is caused to generate a high-frequency corona discharge by applying a high-frequency voltage to an electrode provided on an insulating substance in the ozonizer. A chemical action produced by the generation of the creeping corona discharge is followed by the formation of an active plasma when a high voltage with an extremely short pulse is applied to the ozonizer electrode.

2. Description of the Prior Art

To increase the capacity of an ozonizer a larger flat plate or cyclinder is normally needed. Because the ozonizer is conventionally a plate or cylinder made of ceramics, it is readily subject to a breakage due to fragility. (Japanese Pat. Appln. No. 57-155617)

SUMMARY OF THE INVENTION

In order to achieve the above objects, the present invention provides a relatively inexpensive, expandable, and compact ozonizer device. The device has a first substrate with two sides made of an insulating ceramic material. An electrode is positioned adjacent to the first side of the first electrode. A support member projects from the first substrate in a direction normal to the first side of the first substrate. A second substrate, with two sides, made of an insulating ceramic material, is mounted on the support member. The second substrate has an electrode positioned adjacent the first side of the second substrate which faces away from the first substrate. The first and second substrate and the support member form a space through which gas to be oxidized is passed. A second support member projects from the second substrate in a direction normal to the first side of the second substrate. A third substrate, with two sides, made of an insulating ceramic material, is mounted on the second support member. The second and third substrates and the second support member form a space through which cooling fluid is passed in a direction different from the flow of the gas being oxidized. Preferably, the support members are in the form of corrugated, pillar-shaped, or lattice-shaped members. It is further preferred that the first and second electrodes are planar members that are used to form a uniform electric field.

The invention may be otherwise embodied in a form where linear induction electrodes are positioned on the sides of the substrates that are opposite the substrate sides on which the planar electrodes are mounted. The added linear induction electrodes result in an ozonizer of increased efficiency. The invention may be further embodied in a form where a metal substrate is used in place of one of the two ceramic substrates with mounted electrodes that form an ozonizing unit. The metal substrate performs the containment function and the electric charge function previously performed by the replaced ceramic substrate and electrode.

DESCRIPTION OF THE PREFERRED EMBODIMENT

Figure 1:
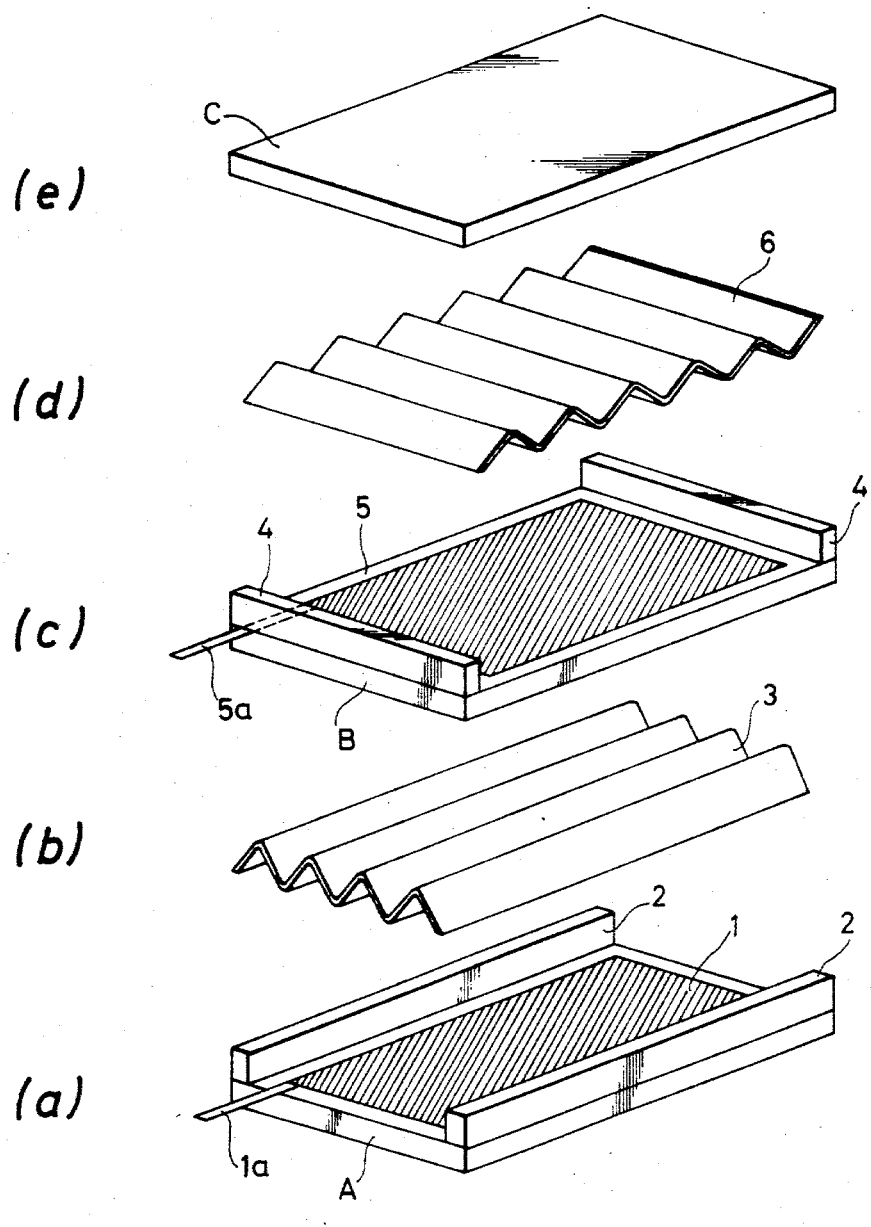
FIG. 1(a)–(e) is an assembly drawing of a partial sheet constituting a basic block or unit embodying the present invention.

Referring now to the drawings, the present invention will be described. FIG. 1 is a perspective assembly drawing illustrating the basic construction of an ozonizer comprising a substrate A of high quality made of fine ceramics such as alumina ceramics and nitrogenized silicon ceramics and a facial electrode 1 on the surface of the substrate. The electrode is composed of a metalized molybdenum or tungsten layer with a nickel coating provided thereon. The substrate further has a terminal 1a at one end and pillar-shaped containment members 2 on the ends perpendicular to the terminal end. The ozonizer further comprises a corrugated support member 3 inserted in the space enclosed by the substrate 1, the pillar-shaped containment members 2 and a substrate B supported on the corrugated support member. Support member 2 is not limited to a corrugated plate but may be otherwise embodied in pillar-shaped support members, similar in shape to the containment members 2, and extending in the same direction as the members 2.

The substrate B, mounted on corrugated support member 3, is similar in construction to the substrate A and has pillar-shaped members 4, installed at the ends in the direction different from and preferably perpendicular to the pillar-shaped containment members 2. This configuration allows the gas to be oxidized to pass over the substrate A but not over the substrate B. When a high-frequency high voltage charge is applied to the electrodes 1, 5, a high-frequency discharge is generated causing $O_2$, for instance, to oxidize and become $O_3$. Thus the assembly acts as an ozonizer.

A substrate C may be mounted on the support means of the substrate B as is shown in FIG. 1. Alternatively, a substrate that is similar to the substrate A may be additionally be mounted on substrate B. The substrate added on substrate B can have an electrode on the under surface thereof. In any of the cases above, the heat generated in the ozonizer can be removed by installing a support member 6 on the substrate B with ridges of the member 6 arranged in the direction different from and preferably perpendicular to that of the ridges of support member 3. A cooling fluid such as air or water may be passed through the space formed between substrates B and C. Because the cooling fluid flows in a different direction than the gas being oxidized, the cooling fluid will never be blended with the $O_2$ or $O_3$.

Figure 2:
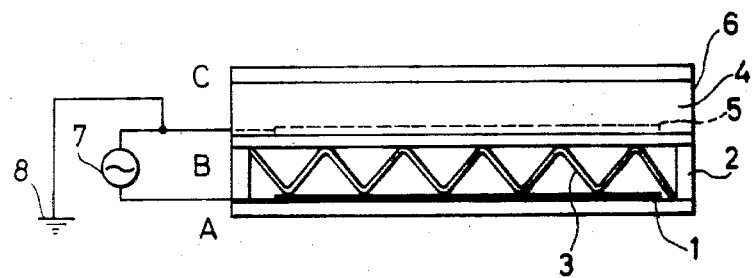
FIG. 2 is an elevational view of the basic block of FIG. 1.
Figure 3:
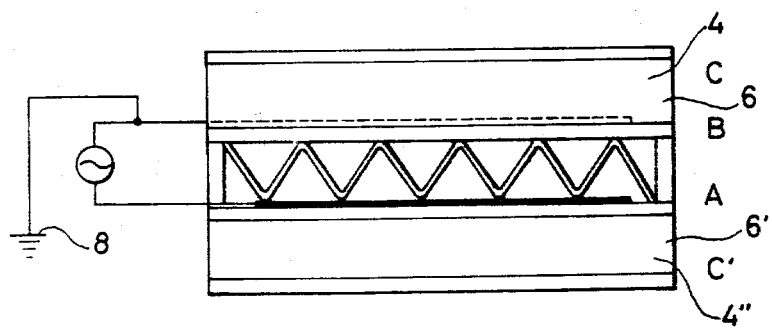
FIGS. 3–5 are elevational views illustrating examples of other applications of the basic block shown in FIG. 1.

FIG. 2 is an elevational view of the ozonizer discussed above in an assembled condition including a high-frequency high voltage power supply 7 and a ground 8. There are subsequently shown other examples of the basic construction of the assembly. As shown in FIG. 3, a corrugated support means 6' and a substrate C' are provided just below the basic block or unit of FIG. 2 to allow cooling fluid to pass under the substrate A for a greater cooling effect.

Figure 4:
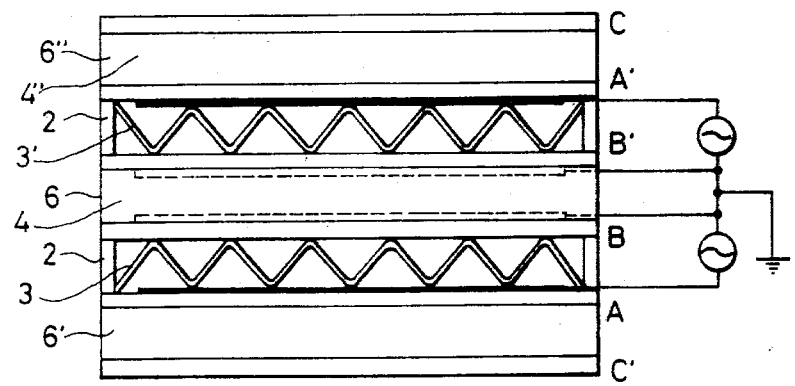

FIG. 4 shows a further advanced version over the construction shown in FIG. 3 wherein a substrate similar to the substrate B, B', is mounted in place of the substrate C. An electrode is added below substrate B' and a corrugated support member 3' is inserted on and above substrate B' with its ridges perpendicular to the ridges of support member 6. Cooling fluid passes between substrates B' and B below the space between substrates B' and A' wherein $O_2$ flows. A substrate similar to A, A', is mounted above substrate B' with an electrode added below substrate A' and a pillar-shaped containment member 4" vertically mounted along the end of substrate A' in a direction parallel to containment members 4. A corrugated support member 6" is also mounted above substrate A'. The substrate C is then mounted above the support member 6". Cooling fluid is provided in the space between substrates A' and C and containment members 4". When the high-frequency high voltage charge is applied to the terminals attached to substrates A and B and to the terminals attached to substrates B' and A' while $O_2$ is passed through the spaces therebetween, a high-frequency discharge is generated across the electrodes, whereby $O_2$ becomes $O_3$. Simultaneously cooling fluid is passed between substrates C' and A, between substrates B and B' and between substrates A' and C. The fluid passes therethrough without blending with $O_2$ or $O_3$ because the corrugated support members have been arranged with their respective ridges oriented in different directions.

Figure 5:
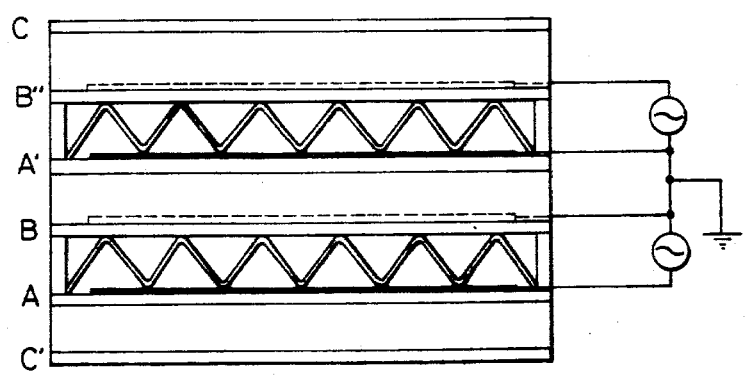

In FIG. 5, the ozonizer of FIG. 3 is combined with the ozonizer of FIG. 2 by replacing the substrate C of FIG. 3 with the ozonier unit of FIG. 2. The spaces between substrates A and B and between substrates A' and B" act as ozonizers, while the spaces between C' and A, B and A', and B" and C act as passages for the cooling fluid.

Figure 6:
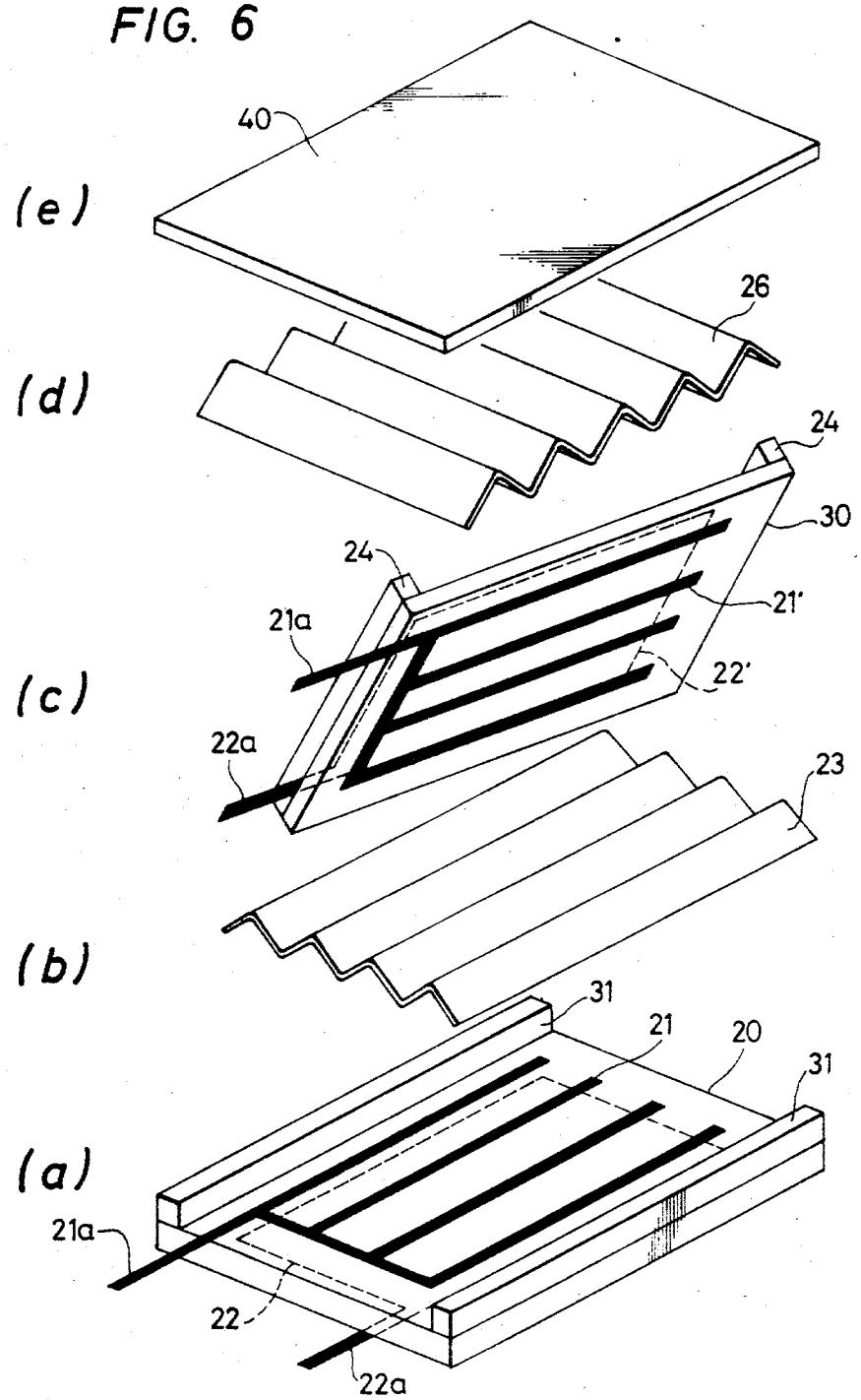
FIG. 6(a)–(e) is an assembly drawing of a partial sheet constituting another embodiment of the present invention.

FIG. 6 is a perspective assembly drawing illustrating the basic construction of another ozonizer embodying the present invention. The ozonizer comprises a substrate substrate 20 of high quality made of fine ceramics, such as alumina and nitrogenized silicon ceramics, and a linear electrode 21 provided on one substrate surface. The electrode is composed of a metalized layer of molybdenum or tungsten with a nickel coating and has a terminal 21a at one end of the substrate. Pillar-shaped containment members 31, are provided along the edges of the substrate that are perpendicular to the edge with the terminal. The substrate 20 also has a plane induction electrode 22 on the opposite substrate surface or in the substrate itself and a terminal 22a at one end thereof. A corrugated support member 23 is inserted in the space enclosed by the substrate 20 and the pillar-shaped containment members 31, for supporting a substrate 30 mounted thereon. The means used to support the overlying substrate is not limited to a corrugated member or plate, and a support means similar in shape to pillar-shaped containment members 31, may be installed in the same direction as that of the members 31. The substrate 30 mounted on the support member 23 is similar in construction to the substrate 20, but because the pillar-shaped containment members 24 at the end edges are arranged in the direction different from that of the pillar-shaped containment members 31, a gas to be oxidized may pass over the substrate 20 but not over the substrate 30. The linear electrode 21' on substrate 30 is similar in construction to that of the linear electrode 21 on substrate 20, but the discharge electrode 21' is arranged on the face opposite to that of the substrate 20, that is, with its face looking down. The substrate 30 also has a plane induction electrode 22' on the opposite substrate surface. When a high-frequency high voltage charge is applied across the electrodes 21, 21' and 22, 22', the high-frequency discharge generated will cause $O_2$, for instance, to oxidize and become $O_3$. Thus the assembly acts as an ozonizer. The electrode 22' and a corrugated support member 26 are mounted on the substrate 30. The ridges of support member 26 should be installed in the direction different from, and preferably perpendicular to that of, the ridges of support member 23. A substrate 40, without an electrode may be mounted on support members 26. Alternatively, a substrate similar to the substrate 20 may additionally be piled thereon in the same direction as that of the substrate 20. In any of the cases above, the heat generated in the ozonizer can be removed by installing the support member 26 on the substrate 30 with the ridges arranged in the direction different from, and preferably perpendicular to that of, the ridges of support member 23 to allow a cooling fluid such as air or water to pass through the space between the substrates 30 and 40. Consequently, the cooling fluid will not be blended with $O_2$ or $O_3$ passing between the substrates 20 and 30.

Figure 7:
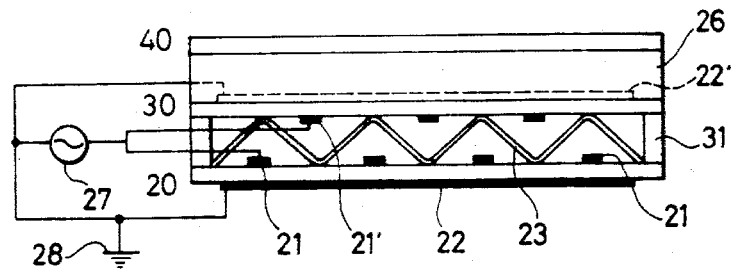
FIG. 7 is an elevational view of the embodiment of FIG. 6.
Figure 8:
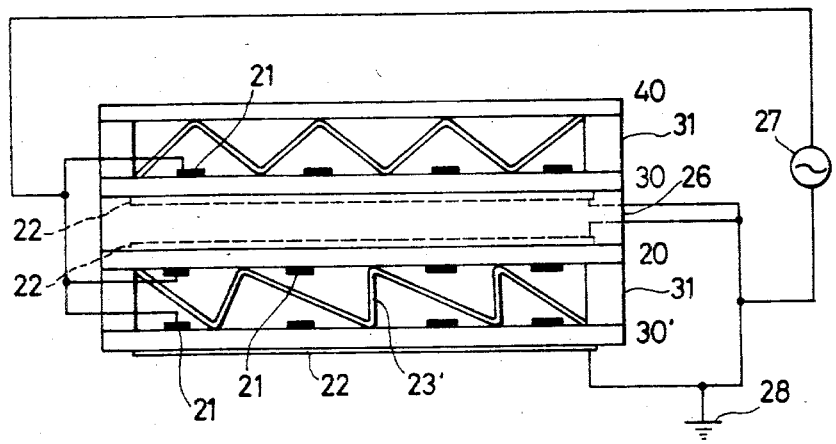
FIGS. 8–9 are elevational views illustrating examples of other applications of the embodiment shown in FIG. 6.

FIG. 7 is an elevational view of the aforementioned ozonizer in the assembled condition including a high-frequency high voltage power supply 27 and a ground 28. There are subsequently shown other embodiments of the invention. As shown in FIG. 8, the corrugated support member 23' and and the substrate 30' are installed just below the basic block of FIG. 7 and, because the reaction gas is allowed to pass between the substrates 20 and 30, and substrates 30 and 40, the volumetric capacity of the FIG. 8 embodiment is greater.

Figure 9:
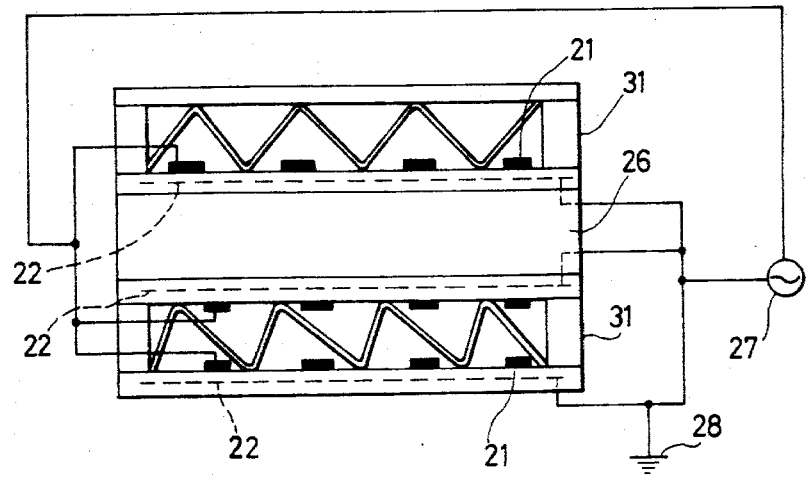

FIG. 9 shows another version of the above construction wherein the induction electrode 22 is provided in the substrate.

Figure 10:
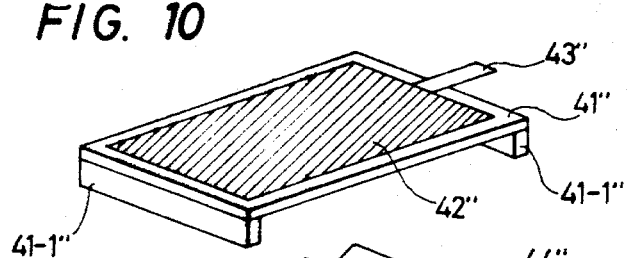
FIG. 10 is a perspective exploded view of still another ozonizer device embodying the present invention.
Figure 10:
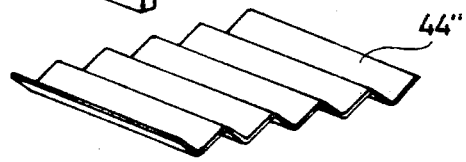
Figure 10:
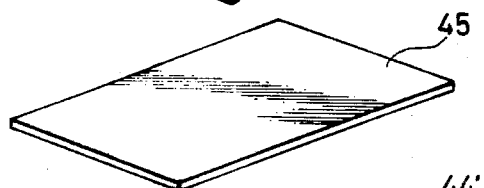
Figure 10:
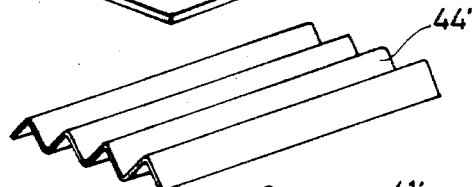
Figure 10:
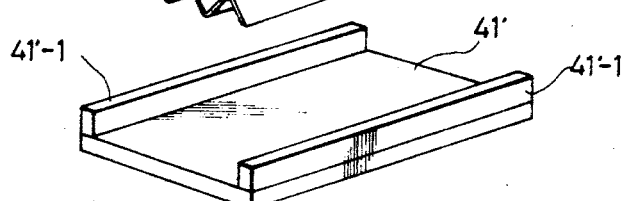
Figure 10:
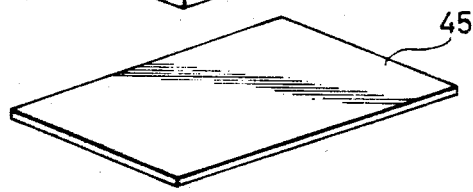
Figure 10:
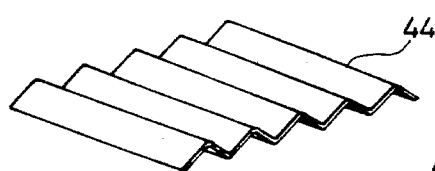
Figure 10:
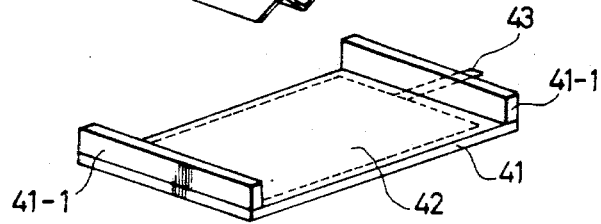
Figure 11:
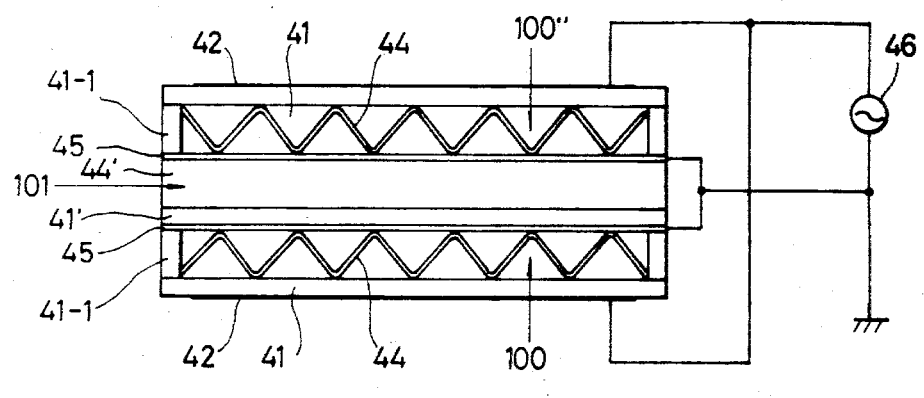
FIG. 11 is an elevational assemb.y drawing of the ozonizer device of FIG. 10 connected to a power supply.

FIG. 10 is a perspective exploded view illustrating the basic construction of still another ozonizer embodying the present invention, and FIG. 11 is an elevational assembly drawing of the ozonizer of FIG. 10 connected to a power supply. As shown in FIG. 10(a), a substrate 41 of high quality made of fine ceramics such as alumina and nitrogenized silicon ceramics is provided with a planar electrode member 42 on the underside thereof, the electrode 42 having a terminal 43. Pillar-shaped containment members 41-1 are provided on the edge of the substrate 41 where the terminal 43 is located and on the opposite edge, each member projecting in the normal direction from the surface opposite to that where the electrode 42 is provided.

A corrugated support member 44 of FIG. 10(b) is inserted in a space enclosed by the substrate 41 and the pillar-shaped containment members 41-1, and a metal substrate 45 of FIG. 10(c) is supported by and mounted on the support member 44. This forms an ozonizer basic block or unit in which a gas may be oxidized. This basic unit may be combined with other similar sections to form an ozonizer of greater capacity.

As is obvious from FIGS. 10(f), (g), (h), a substrate 41'' having an electrode 42'', pillar-shaped containment members 41-1'', a support member 44'', and a metal substrate 45'' similar in construction to those of FIGS. 10(a), (b), (c) are used to constitute another basic unit. Two ozonizer units are combined with one unit inverted and mounted on the other to arrange the metal substrates 45 and 45'' opposed to each other. A further substrate 41' of FIG. 10(d), provided with projected containment members 41'-1 on the edges different from the edges of the substrates of FIG. 10(a), and (h), is installed in between the metal substrates 45 and 45'' of the two basic units. A corrugated support member 44' of FIG. 10(e), installed with ridges in a different direction from the ridges of support members 44 and 44'' (perpendicular direction in the drawing), is inserted in the space isolated by the containment members 41'-1, and the substrates 41' and 45''. These blocks are piled up to allow a cooling fluid to be distributed through the space 101 of FIG. 11.

In the ozonizer thus constructed, a silent discharge is caused when a power supply 46 is connected across the electrodes 42 and 42'' and the metal substrates 45 and 45'' to apply a high-frequency high voltage. The discharge will cause a gas passing through the spaces 100 and 100'' to oxidize, for instance $O_2$ oxidizing to become $O_3$. Thus the assembly acts as an ozonizer. The heat generated in the ozonizer can be removed by making a cooling fluid such as air or water pass through the space 101. Because the support member 44' is installed in different directions from the supports 44 and 44'', the cooling fluid is prevented from blending with the gas being oxidized.

It is within the scope of the present invention to properly combine more blocks or units of such construction for building a multilayer ozonizer.

As set forth above, a small-sized, large capacity ozonizer is obtainable by piling up layers of ozonizer blocks or units, providing for a passage of a cooling fluid between the ozonizers, and inserting corrugated and/or pillar-shaped support means in the ozonizer in directions perpendicular to each other. Moreover, a gas to be oxidized and a cooling fluid are allowed to pass through the ozonizer without blending with each other and the use of the support means not only helps improve the strength of the ozonizer but also compensates for the fragility of ceramics, so that an easy-to-operate ozonizer may be available.

EXAMPLE 1

(FIGS. 1-5)

To prepare substrates A and B, a known organic binding material was added to a known alumina ceramic base material containing more than 90% alumina and the mixture was rolled to prepare a 100×100 mm square green sheet 0.5 mm thick. An 80×80 mm metal layer square 50 um thick was printed on one face of the sheet through a screen printing process using tungsten paste. The sheet was then dried and plated with nickel after being burned at 1,600° C. in an atmosphere of $H_2$ for two hours.

Subsequently, a corrugated support member was prepared from the sheet of the same quality, and 3×3×100 mm pillar-shaped containment members of the same quality alumina ceramic for use at side edges were prepared. These parts were assembled into the shapes of FIGS. 2–4 using a silicon resin adhesive or glass. When $O_2$ and water as a cooling fluid were distributed as above described, upon the application of a high-frequency high voltage of 10 KHz, 3,000 V, there was obtained a high percentage of $O_3$ converted from $O_2$ without an increase in temperature or operating trouble.

EXAMPLE 2

(FIGS. 6-9)

To prepare substrates A and B, a known organic binding material was added to a known alumnna ceramic base material containing more then 90% alumina and the mixture was rolled to prepare a 100×100 mm square green sheet 0.5 mm thick. An 80×80 mm square electrode layer 22 having a thickness of 50 um was printed on one face of the sheet and a linear electrode 21 was printed on the other face through a screen printing process using tungsten paste. The sheet was then dried and plated with nickel after being burned at 1,600° C. in an atmosphere of $H_2$ for two hours.

Subsequently, a corrugated support member 23 was prepared from the sheet of the same quality, and 3×3×100 mm pillar-shaped containment members of the same quality alumina ceramics for use at said edges were prepared. These parts were assembled into the shapes of FIGS. 7-8 using a silicon resin adhesive or glass. When $O_2$ and water as a cooling fluid were distributed as above described, upon the application of a high-frequency high voltage of 10 KHz, 3,000 V, there was obtained a high percentage of $O_3$ converted from $O_2$ without an increase in temperature or operating trouble.

EXAMPLE 3

(FIGS. 10-11)

To prepare substrates 41, 41' and 42'' of FIG. 10, a known organic binding material was added to a known alumina ceramic base material containing more than 90% alumina and the mixture was rolled to prepare a 100×100 mm square green sheet 0.5 mm thick. To prepare the electrodes 42 and 42'', an 80×80 mm square metal layer 50 um thick was printed on one face of the substrate 41 through a screen printing process using tungsten paste. The sub trate was then dried and plated with nickel after being burned at 1,600° C. in an atmosphere of $H_2$ for two hours.

Subsequently, corrugated support members 44, 44' and 44'' were prepared from sheets of the same quality and 3 mm×3 mm×100 mm pillar-shaped containment members 41-1, 41-1' and 41-1'' were prepared from sheets of the same quality. These parts were assembled as above described using a silicon resin adhesive or glass. When $O_2$ and water as a cooling fluid were distributed respectively through spaces 100 and 101 as above described, upon the application of a high-frequency high voltage of 10 KHz, 3,000 V, there was obtained a high percentage of $O_3$ converted from $O_2$ without an increase in temperature or operating trouble.

Figure 12:
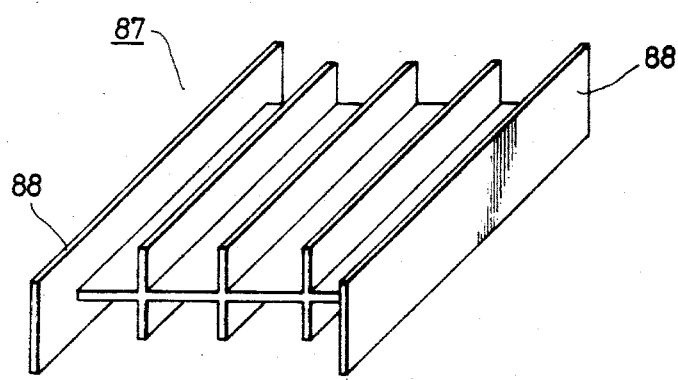
FIG. 12 is a perspective view illustrating another construction of the support means 3 shown in FIG. 1.

Although corrugated support members have been referred to in the above description, support means according to the present invention are not limited to such and may instead use a plurality of pillar-, rod- or tube-shaped support members. Moreover, lattice-like support members 87 shown in a perspective view in FIG. 12 are also acceptable. The lattice-like support members 87 use side plates 88 on both sides and, because the pillar-shaped containment members and the corrugated support members are no longer needed, production costs are reduced.

Substrates and support members in the above examples of the present invention are so arranged as to be separately burned before being assembled using an adhesive agent. However, it is also possible to assemble parts from raw sheets, after which the parts are dried and burned. In so doing, the heat resistance of the parts may be increased further.

What is claimed is:

1. A ceramic ozonizer device comprising:
   a first substrate comprised of an insulating ceramic material and having a first side and a second side;
   a first electrode positioned adjacent said first side of said first substrate;
   first support means projecting in the normal direction from said first side of said first substrate;
   a second substrate comprised of an insulating ceramic material and having a first side and a second side, said second substrate being mounted on said first support means, said first side facing away from said first substrate;
   a second electrode positioned adjacent said first side of said second substrate,
   wherein said first and second substrates and said first support means form a sealed conduit having two open ends through which gas to be oxidized is passed, oxidation of the gas occurring upon the application of high voltage across said first and said second electrodes;
   second support means projecting in the normal direction from said first side of said second substrate; and
   a third substrate comprised of an insulating ceramic material mounted on said second support means, wherein said second and third substrates and said second support means form a second sealed conduit having two open ends through which cooling fluid is passed in a direction different from the flow direction of the gas being oxidized.

2. The device as recited in claim 1 wherein said support means is a corrugated member.

3. The device as recited in claim 1 wherein said support means is a pillar-shaped member.

4. The device as recited in claim 1 wherein said support means is a lattice-shaped member.

5. The device as recited in claim 1 wherein said first and second electrodes are planar members and are used to form a uniform electric field.

6. A ceramic ozinizer device comprising:
   a first substrate comprised of an insulating ceramic material and having a first side and a second side;
   a first linear discharge electrode positioned adjacent said first side of said first substrate, and a first planar induction electrode positioned adjacent said second side of said first substrate;
   first support means projecting in the normal direction from said first side of said first substrate;
   a second substrate comprised of an insulating ceramic material and having a first side and a second side, said second side facing said first substrate, said second substrate being mounted on said first support means;
   a second linear discharge electrode positioned adjacent said second side of said second substrate, and a second planar induction electrode on said first side of said second substrate facing away from said first substrate,
   wherein said first substrate and said second substrate and said first support means form a sealed conduit having two open ends through which a gas to be oxidized is passed in a single direction, oxidation of the gas occurring upon the application of a high voltage across said first and said second electrodes;
   second support means projecting in the normal direction from said first side of said second substrate; and
   a third substrate comprised of an insulating ceramic material mounted on said second support means, wherein said second substrate and said third substrate and said second support means form a second sealed conduit having two open ends through which cooling fluid is passed in a direction different from the direction of flow of the gas to be oxidized.

7. The device as recited in claim 6 wherein said first support means and said second support means are corrugated members.

8. The device is recited in claim 6 wherein said first support means and said second support means are pillar-shaped members.

9. The device as recited in claim 6 wherein said first support means and said second support means are lattice-shaped members.

10. A ceramic ozonizer device comprising:
    a first substrate comprised of an insulating ceramic material and having a first side and second side;
    a first planar electrode positioned adjacent said first side of said first substrate;
    first support means projecting in a normal direction from said first side of said first substrate;
    a second substrate mounted on said first support means, said second substrate comprised of metal;
    wherein said first substrate and said second substrate and said first support means form a sealed conduit having two open ends through which gas to be oxidized is passed in a single direction, oxidation of the gas occurring upon the application of a high voltage across said first electrode and said second substrate;
    a third substrate comprised of insulating ceramic material, said third substrate having a first side and second side, said second side of said third substrate mounted on said second substrate;
    second support means projecting in a normal direction from said first side of said third substrate;
    a fourth substrate mounted on said second support means, said fourth substrate comprised of metal, said fourth substrate having a first side and a second side, said second side of said fourth substrate facing said third substrate,
    wherein said third substrate and said fourth substrate and said second support means form a second sealed conduit having two open ends through which cooling fluid is passed in a single direction different from the flow direction of the gas being oxidized;
    a fifth susbtrate comprised of an insulating ceramic material, said fifth substrate having a first side and second side, said second facing said fourth substrate;

a second planar electrode on said first side of said fifth substrate;

third support means projecting in a normal direction from said second side of said fifth substrate, said third support means mounted on said first side of said fourth substrate and projecting in a normal direction, wherein said fourth substrate and said fifth substrate and said third support means form a third sealed conduit having two open ends through which gas to be oxidized is passed in the same flow direction as the gas being oxidized between said first and second substrates.

11. The device as recited in claim 10 wherein said first, second, and third support means are corrugated members.

12. The device as recited in claim 10 wherein said first, second, and third support means are pillar-shaped members.

13. The device as recited in claim 10 wherein said first, second, and third support means are lattice-shaped members.

14. The device as recited in claim 10 wherein said first and second electrodes and said second and fourth metal substrates are planar and are used to form uniform electric fields.

15. The device as recited in claim 6 wherein oxidation of gas occurs along said first and second linear discharge electrodes when a high voltage is applied between said first and second planar induction electrodes and said first and second linear discharge electrodes, respectively.

* * * * *